United States Patent
Luo et al.

(10) Patent No.: US 11,455,593 B2
(45) Date of Patent: Sep. 27, 2022

(54) DELIVERING ITEMS TO UNATTENDED VEHICLES

(71) Applicant: Ford Global Technologies, LLC, Dearborn, MI (US)

(72) Inventors: John Weizhong Luo, Dearborn, MI (US); Lynn Valerie Keiser, Dearborn, MI (US); Hyung Min Baek, Dearborn, MI (US); Aysha Habbaba, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 548 days.

(21) Appl. No.: 16/469,256

(22) PCT Filed: Dec. 14, 2016

(86) PCT No.: PCT/US2016/066692
§ 371 (c)(1),
(2) Date: Jun. 13, 2019

(87) PCT Pub. No.: WO2018/111264
PCT Pub. Date: Jun. 21, 2018

(65) Prior Publication Data
US 2020/0019924 A1    Jan. 16, 2020

(51) Int. Cl.
*G06Q 10/08*   (2012.01)
*B60R 5/00*    (2006.01)
(Continued)

(52) U.S. Cl.
CPC .......... *G06Q 10/0832* (2013.01); *B60R 5/00* (2013.01); *B60R 25/24* (2013.01); *B60R 25/305* (2013.01); *G06Q 10/0835* (2013.01)

(58) Field of Classification Search
CPC .. G06Q 10/0832; G06Q 10/0835; B60R 5/00; B60R 25/24; B60R 25/305
(Continued)

(56) References Cited

U.S. PATENT DOCUMENTS 9,643,722 B1 * 5/2017 Myslinski .......... G06K 9/00711
10,210,689 B1 * 2/2019 Cermak ................ B60R 25/246
(Continued)

OTHER PUBLICATIONS

"A Study on Amazon Prime Air for Feasibility and Profitability—A Graphical Data Analysis." Published by IOSR Journals (Year: 2014).*

*Primary Examiner* — Zeina Elchanti
(74) *Attorney, Agent, or Firm* — Brandon Hicks; Eversheds Sutherland (US) LLP

(57) ABSTRACT

The present invention extends to methods, systems, and computer program products for delivering items to unattended vehicles. In general, aspects of the invention facilitate controlled access to one or more portions of a vehicle for item deliver. A vehicle is configured with partitions. The partitions can be deployed to close off portions of the vehicle from an area used to accept a delivered item. Partitions may be automatically deployed when a delivery arrives (from a delivery person or robot) to section off a compartment of the vehicle to limit access to the sectioned compartment. Partitions can be re-configured to prevent external access to the sectioned off compartment after a delivery is completed.

19 Claims, 7 Drawing Sheets

(51) Int. Cl.
  *B60R 25/24* (2013.01)
  *B60R 25/30* (2013.01)
(58) Field of Classification Search
  USPC ............................................ 705/332
  See application file for complete search history.

(56) References Cited

U.S. PATENT DOCUMENTS

| | | | | |
|---|---|---|---|---|
| 10,755,206 | B2* | 8/2020 | Zamer | G06Q 30/0601 |
| 2004/0102979 | A1* | 5/2004 | Robertson | G06Q 10/08 |
| | | | | 705/6 |
| 2005/0033615 | A1* | 2/2005 | Nguyen | G06Q 10/1095 |
| | | | | 705/5 |
| 2005/0143883 | A1* | 6/2005 | Yamagiwa | G06Q 10/087 |
| | | | | 701/29.6 |
| 2007/0208681 | A1* | 9/2007 | Bucholz | G08G 1/017 |
| | | | | 706/47 |
| 2009/0265248 | A1* | 10/2009 | Walker | G07B 17/0008 |
| | | | | 705/17 |
| 2012/0233000 | A1* | 9/2012 | Fisher | G06F 16/78 |
| | | | | 705/14.71 |
| 2013/0006693 | A1* | 1/2013 | Haynes, III | G06Q 10/1095 |
| | | | | 705/7.23 |
| 2013/0054293 | A1* | 2/2013 | Sen | G06Q 50/10 |
| | | | | 705/7.18 |
| 2014/0025421 | A1* | 1/2014 | Sen | G06Q 50/10 |
| | | | | 705/7.23 |
| 2014/0111647 | A1* | 4/2014 | Atsmon | G08G 1/04 |
| | | | | 348/148 |
| 2014/0222711 | A1* | 8/2014 | Tibbs | G06Q 10/0833 |
| | | | | 705/337 |
| 2014/0254879 | A1* | 9/2014 | Smith | G08G 1/017 |
| | | | | 382/105 |
| 2015/0227882 | A1* | 8/2015 | Bhatt | G06Q 10/083 |
| | | | | 705/330 |
| 2015/0302347 | A1* | 10/2015 | Fredette | G06Q 10/083 |
| | | | | 705/15 |
| 2016/0071051 | A1* | 3/2016 | Tibbs | G06Q 10/083 |
| | | | | 705/337 |
| 2016/0096508 | A1* | 4/2016 | Oz | H04W 4/023 |
| | | | | 701/36 |
| 2016/0189098 | A1* | 6/2016 | Beaurepaire | H04W 12/084 |
| | | | | 705/337 |
| 2017/0046658 | A1* | 2/2017 | Jones | G06Q 10/0835 |
| 2018/0144426 | A1* | 5/2018 | Grbac | G06F 16/48 |
| 2018/0240067 | A1* | 8/2018 | Oz | G07C 9/00182 |
| 2018/0278462 | A1* | 9/2018 | Bjontegard | A63F 13/217 |
| 2018/0315013 | A1* | 11/2018 | Wilkinson | G05D 23/1917 |
| 2018/0315015 | A1* | 11/2018 | Pientka | G06Q 10/06 |

* cited by examiner

DELIVERING ITEMS TO UNATTENDED VEHICLES

CROSS-REFERENCE TO RELATED APPLICATIONS

Not applicable.

BACKGROUND

Field of the Invention

This invention relates generally to item delivery, and, more particularly, to delivering items to unattended vehicles.

Related Art

Delivering an item to a vehicle typically requires a person to be at the vehicle. The person authorizes the delivery service to leave the item and provides the delivery service access to the vehicle. Unattended delivery of an item to a vehicle is typically not possible. There is no way to get an item into a locked vehicle while keeping the vehicle secure. For example, opening a trunk to accept a delivered item poses a security risk to other items in the trunk.

BRIEF DESCRIPTION OF THE DRAWINGS

The specific features, aspects and advantages of the present invention will become better understood with regard to the following description and accompanying drawings where.

DETAILED DESCRIPTION

Figure 1:
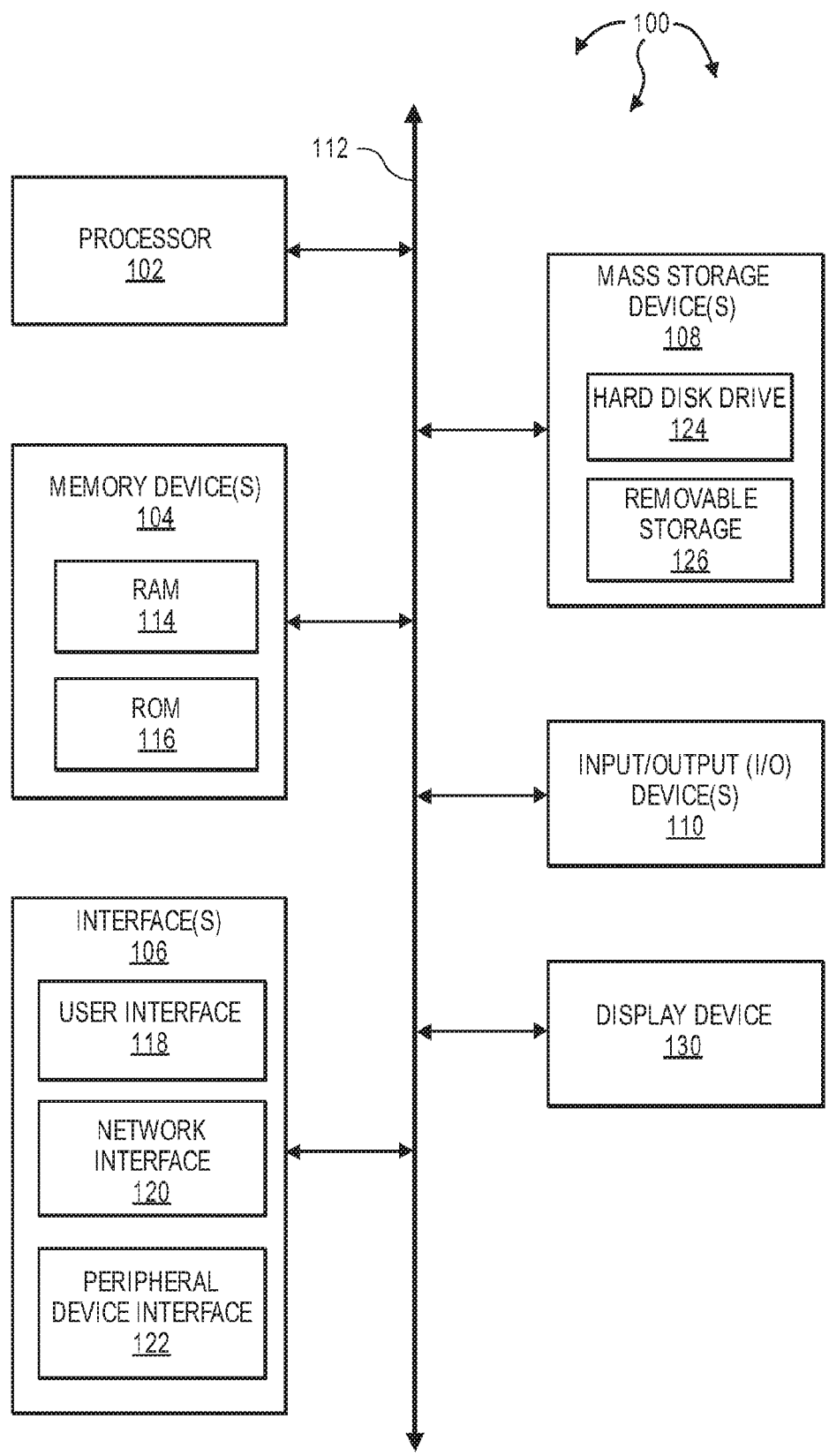
FIG. 1 illustrates an example block diagram of a computing device.

The present invention extends to methods, systems, and computer program products for delivering items to unattended vehicles.

In general, aspects of the invention facilitate controlled access to one or more portions of a vehicle for item delivery. A vehicle is configured with one or more partitions. The one or more partitions can be configured to close off portions of the vehicle from an area used to accept a delivered item. Partitions may be automatically deployed when a delivery arrives (from a delivery person or robot), sectioning off a compartment of the vehicle to limit access to the sectioned compartment.

For example, in a Sport Utility Vehicle (SUV), partitions (e.g., valences) may be deployed to section off the rear compartment of the vehicle. The rear compartmented section can be accessed via the rear door to provide delivery access. Access to the rear compartmented section allows packages or items to be delivered to the rear of the SUV. The partitions also restrict access from other areas of the vehicle, including the back seats, front seats, glove compartment and other areas and compartments where access is not necessary to deliver an item.

Partitions can be made from any of a variety of materials, such as, for example, wire mesh, vinyl, plastic, wood, etc. Partitions can be in any of a variety of configurations, such as, for example, roll-down style blinds that lock in place when deployed, foldable partitions that can be extended and deployed automatically, etc. Partitions can be used to restrict access to a delivery compartment in any part of a vehicle, such as, for example, a trunk, a back seat, a truck bed, rear of an SUV, other cargo areas, etc.

To accept a delivery, a vehicle may be placed in a delivery mode (e.g., similar to a valet mode often used for valet parking) where access and operations of the vehicle are restricted for item delivery operations. Placing a vehicle in delivery mode can include giving a delivery service access to an opening or door in and/or to the vehicle to make a delivery. After the delivery is made, the vehicle can close the opening, lock the door, etc.

A vehicle can include one or more processors, communication components, one or more sensors, and partition control components for configuring and reconfiguring (e.g., opening and closing) partitions. Communication components can include components facilitating wireless communication such as, for example, cellular modems, network cards, Bluetooth hardware, etc. Sensors can include cameras, weight sensors, motion sensors, etc.

In one aspect, an authorized user (e.g., a vehicle owner or surrogate) can use a smart phone or computer system to wirelessly communicate with a vehicle via the vehicle's communication components. Using wireless communication, the authorized user can remotely activate delivery mode at the vehicle. Activation of delivery mode can be include opening a delivery compartment or temporarily placing the vehicle in a configuration where a delivery person or robot can open a delivery compartment.

In one aspect, an authorized user uses wireless communication to notify the one or more processors to open the delivery compartment. In response to the notification, the one or more processors instruct the partition control components to reconfigure one or more partitions to open a delivery compartment at the vehicle for external access. A delivery person or robot can then access the delivery compartment to place an item in the delivery compartment.

In another aspect, a vehicle can include a switch connected to the one or more processors and/or the partition control components. The switch can be physical or virtual (e.g., on a keypad). In general, the switch is de-activated rendering switch functionality inert (i.e., selecting the switch doesn't do anything). Using wireless communication, an authorized user can activate the switch (and possibly send a notification to a delivery person or robot). The delivery person or robot can manually select (press, flip, push, etc.) the switch. Selection of the switch activates the partition control components (e.g., in response to instructions from the one or more processors) to open the compartment. The delivery person or robot can then access the delivery compartment to place an item in the delivery compartment.

In delivery mode, a vehicle can permit some delivery related communication between the vehicle and a delivery person or robot. Other non-delivery related communication from a delivery person or robot can be restricted.

When a delivery is complete, the one or more processors can instruct the partition control components to reconfigure one or more partitions to close the delivery compartment, restricting further access. In one aspect, the one or more sensors sense when an item is placed within a delivery compartment. The sensors can send sensor data to the one or more processors. In response to the sensor data, the one or more processors automatically instruct the partition control components to close the delivery partition.

Alternately, the sensors can indicate to an authorized user via wireless communication when an item is sensed within the delivery compartment. Using wireless communication, the authorized user can then remotely de-activate delivery mode at the vehicle. In response to de-activation, the one or more processors can instruct partition control components to reconfigure one or more partitions to close the delivery compartment.

In another aspect, a delivery person or robot can manually select (press, flip, push, etc.) the switch when a delivery is complete. Selection of the switch activates the partition control components (potentially in response to instructions from the one or more processors) to close the compartment. An authorized user can then send additional wireless communication to the vehicle to subsequently de-activate the switch (and de-activate delivery mode).

In a further aspect, a camera at the vehicle transmits video of a delivery compartment to a smart phone or computer system of an authorized used. The authorized user views the video to remotely monitor item delivery. When a delivery is complete, the authorized user uses wireless communication to remotely de-activate delivery mode at vehicle. In response, the one or more processors can instruct partition control components to reconfigure one or more partitions to close a delivery compartment at the vehicle.

It may be that a vehicle has a more secure (and potentially separate) compartment that is further restricted by a code or other access (e.g., physical) key for heightened security. The more secure compartment can be used to receive deliveries of valuable items, pharmacy items, and other items that require higher security. The more secure compartment may be nested within another delivery compartment at a vehicle.

A delivered item can be virtually anything, including but not limited to a box, a package, a piece of luggage, flowers, a present, medicine, an electronic device, a book, etc.

Aspects of the invention can be implemented in a variety of different types of computing devices. FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, radars, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
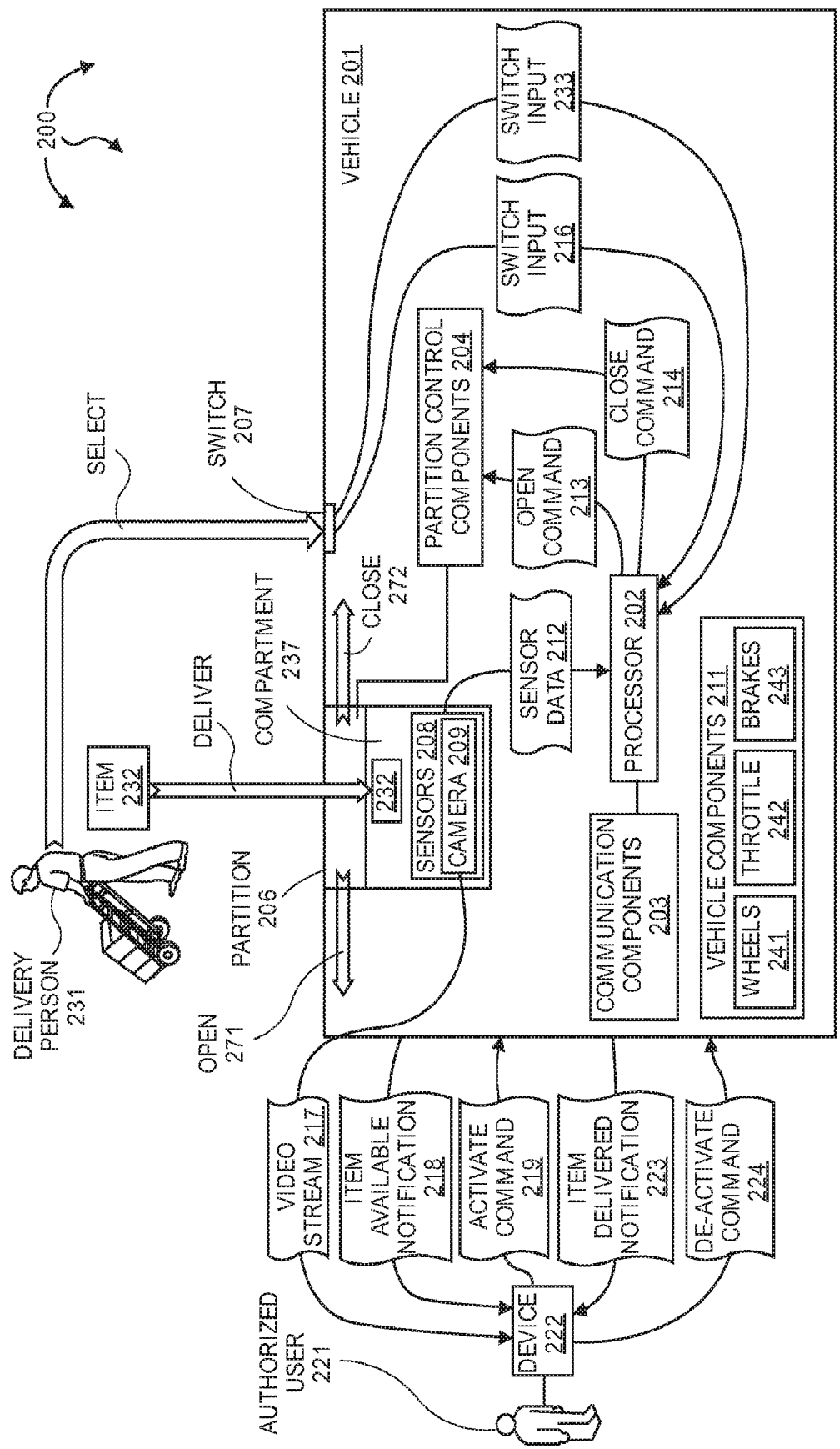
FIG. 2 illustrates an example environment that facilitates delivering items to unattended vehicles.

FIG. 2 illustrates an example environment 200 that facilitates delivering items to unattended vehicles. As depicted, environment 200 includes unattended vehicle 201 and device 222. Device 222 can belong to authorized user 221, an owner of vehicle 201 (or surrogate thereof). Authorized user 221 can be at a geographical remote location relative to vehicle 201. Vehicle 201 can be a car, truck, bus, van, motorcycle, etc.

As depicted, vehicle 201 includes a processor 202 (e.g., a hardware processor), communication components 203, partition control components 204, sensors 208, and vehicle components 211. Each of processor 202, communication components 203, partition control components 204, sensors 208, and vehicle components 211, as well as their respective components can be connected to one another over (or be part of) a network, such as, for example, a PAN, a LAN, a WAN, a controller area network (CAN) bus, and even the Internet. Accordingly, each of processor 202, communication components 203, partition control components 204, sensors 208, and vehicle components 211, as well as any other connected computer systems and their components, can create message related data and exchange message related data (e.g., near field communication (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over the network.

Communication components 203 can include hardware components (e.g., a wireless modem, wireless network card, Bluetooth hardware) and/or software components (e.g., a protocol stack) for wireless communication with other vehicles and/or computer systems. Communication components 203 can be used to facilitate vehicle to vehicle (V2V) communication as well as vehicle to infrastructure (V2I) communication. In some aspects, communication components 203 can receive data from other vehicles and/or devices related to the delivery of an item to vehicle 201. Communication components 203 can forward the data to processor 201. Likewise, processor 201 can send data for transmission to others vehicles and/or devices to communication components 203.

Sensors 208 can include one or more sensors, including camera 209. Sensors 208 can also include other types of sensors, such as, for example, a scale (weight sensor), microphone(s), LIDAR sensor(s), ultrasonic sensor(s), radar sensors, acoustic sensors, etc. In general, sensors 208 can detect when an item has been placed into compartment 237. Sensors 208 can send sensor data to processor 202 (e.g., when an item is detected in compartment 237).

Partition control components 204 can be used to control partition 206. Processor 202 can activate partition control components 204 to open and close partition 206. Switch 207 can be selected to send a signal to processor 202 to request opening and closing of partition 206. In other aspects, processor 202 receives messages through wireless communication components 203 requesting opening and closing of partition 206. As depicted, partition 206 can slide in one direction to open 271 and can slide in the opposite direction to close 272. When partition 206 is open, items can be placed into compartment 237.

Vehicle components 211 can include any components related to operating a vehicle. As depicted, vehicle components 211 includes one or more of wheels 241, throttle 242, and brakes 243.

Device 222 can be a smart phone or computer system used by authorized user 221.

Figure 3:
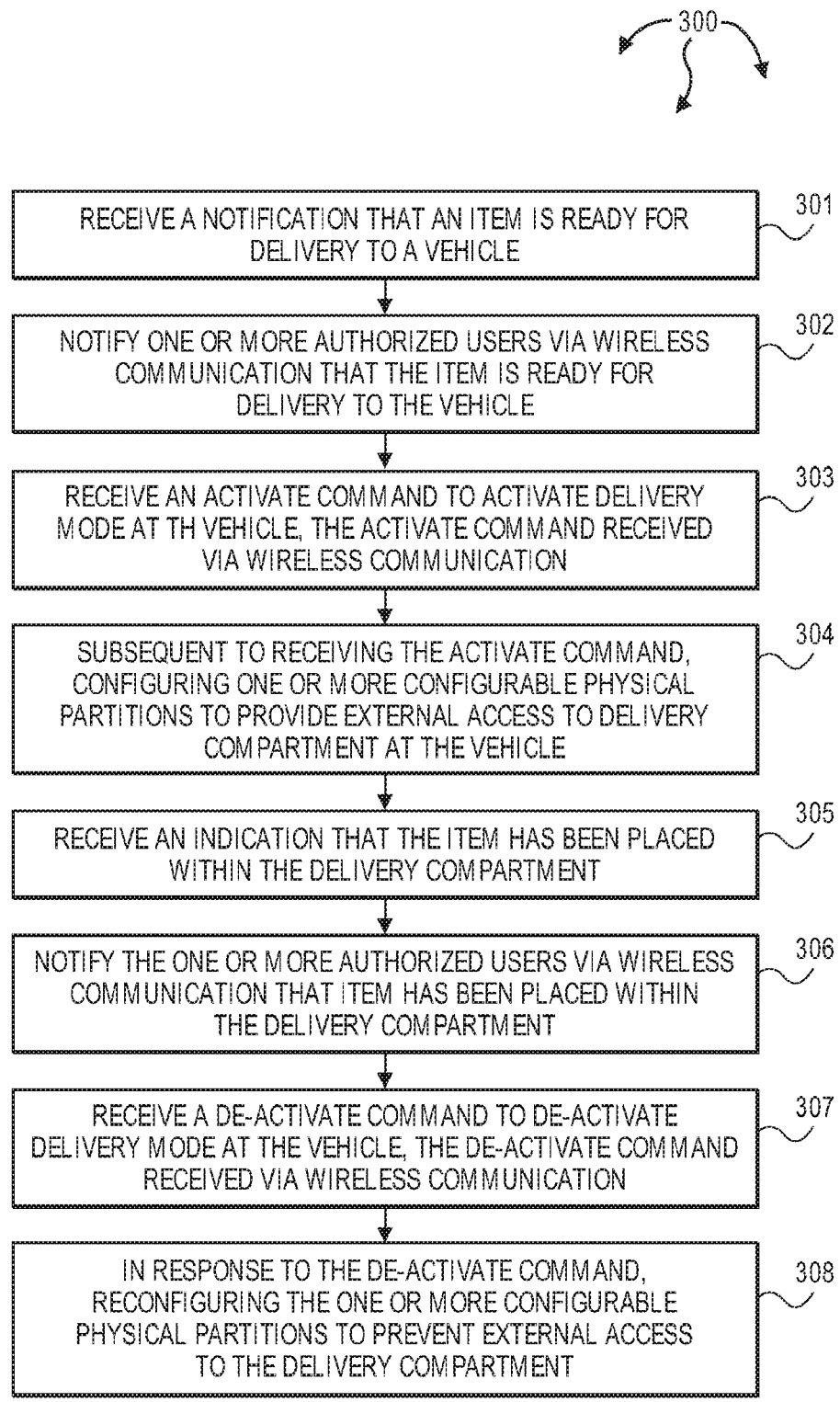
FIG. 3 illustrates a flow chart of an example method for delivering items to unattended vehicles.

FIG. 3 illustrates a flow chart of an example method 300 for delivering items to unattended vehicles. Method 300 will be described with respect to the components and data of computer architecture 200.

Vehicle 201 can be in a remote location relative to authorized user 221. For example, authorized user 221 can park vehicle 201 (e.g., in a parking lot, driveway, street, etc.) and then travel to some other location.

Method 300 includes receiving a notification that an item is ready for delivery to a vehicle (301). For example, delivery person (or robot) 231 can approach vehicle 201 with the intent to deliver item 232. In one aspect, delivery person (or robot) 231 has a computing device. The delivery person (or robot) 231 can use the computing device to communicate to vehicle 201 an intent to deliver item 232. In another aspect, delivery person (or robot) 231 selects switch 207. In response, switch 207 sends switch input 216 to indicate an intent to deliver item 232 to vehicle 201.

Method 300 includes notifying one or more authorized users via wireless communication that the item is ready for delivery to the vehicle (302). For example, vehicle 201 can send item available notification 218 to device 222 via wireless communication. Item available notification 218 indicates the intent of delivery person (or robot) 231 to deliver item 232 to vehicle 201. Item available notification 218 can include data related to the delivery of item 232. Device 222 can notify authorized user 221 by presenting the delivery related data to authorized user 221 through a user-interface. Item available notification 218 can be sent in response to communication from delivery person (or robot) 231's computing device and/or switch input 216.

Authorized user 221 can review delivery related data and decide to accept or reject the delivery of item 232. If authorized user 221 decides to reject delivery of item 232, authorized user 221 can send a rejection message back to vehicle 201. Vehicle 201 can receive the rejection message and take appropriate action to notify deliver person (or robot) 231 that delivery of item 232 is not accepted. On the other hand, if authorized user 221 decides to accept delivery of item 232, authorized user 221 can cause device 222 to send activate command 219 to vehicle 201 via wireless communication. Activate command 219 can instruct vehicle 201 to activate delivery mode.

Method 300 includes receiving an activate command to activate delivery mode at the vehicle, the activate command received via wireless communication (303). For example, vehicle 201 can receive activate command 219 from device 222 to activate delivery mode at vehicle 201. Activate command 219 can be received via wireless communication.

Method 300 includes subsequent to receiving the activate command, configuring one or more configurable physical partitions to provide external access to delivery compartment at the vehicle (304). For example, in response to activate command 219, vehicle 201 can activate delivery mode. Processor 202 can send open command 213 to partition control components 204. Open command 213 instructs partition control components 204 to open 271 partition 206. Opening partition 206 provides external access to compartment 237.

Upon partition 206 opening, delivery person (or robot) 231 can deliver item 232 by placing item 232 into compartment 237. Sensors 208, including camera 209, can sense the presence of item 232 in compartment 237. Sensors 208 can send sensor data 212 indicating the presence of item 232 to processor 202. Alternately or in combination, after placing item 232 in compartment 237, delivery person (or robot) 231 can again select switch 207. In response, switch 207 sends switch input 233 to indicate item 232 was delivered to vehicle 201.

Camera 209 can also send video stream 217 (via wireless communication) to device 222 for viewing by authorized user 221. Device 222 can present video stream 217 to authorized used 221 at a user-interface.

Method 300 includes receiving an indication that the item has been placed within the delivery compartment (305). For example, processor 202 can receive one or more of sensor data 212 and switch input 233. Based on sensor data 212 and/or switch input 233, processor 202 can determine that item 232 was placed within compartment 237.

Method 300 includes notifying the one or more authorized users via wireless communication that item has been placed within the delivery compartment (306). For example, vehicle 201 can send item delivered notification 223 to device 222 via wireless communication. Item delivered notification 223 indicates that item 232 was delivered to vehicle 201. Item delivered notification 223 can include further data related to the delivery of item 232. Device 222 can notify authorized user 221 by presenting the further delivery related data to authorized user 221 through a user-interface.

Authorized user 221 can consider video stream 217 and/or item delivered notification 223 to determine if item 232 was appropriately (e.g., securely) delivered to vehicle 201. If authorized user 221 determines that item 232 was not appropriately delivered, authorized user 221 can use device 222 to contact delivery person 231 or other deliver personnel (e.g., a supervisor) for corrective action. Corrective action can include delivery a different item, checking that item 232 is fully within compartment 237, etc. On the other hand, if authorized user 221 determines that item 232 was appropriately delivered, authorized user 221 can cause device 222 to send de-activate command 224 to vehicle 201 via wireless communication. De-activate command 224 instructs vehicle 201 to de-activate delivery mode.

Method 300 includes receiving a de-activate command to de-activate delivery mode at the vehicle, the de-activate command received via wireless communication (307). For example, vehicle 201 can receive de-activate command 224 from device 222 to de-active delivery mode at vehicle 201. Vehicle 201 can receive de-activate command 224 via wireless communication.

Method 300 includes in response to the de-activate command, reconfiguring the one or more configurable physical partitions to prevent external access to the delivery compartment (308). For example, in response to de-activate command 224, vehicle 201 can de-activate delivery mode. Processor 202 can send close command 214 to partition control components 204. Close command 214 instructs partition control components 204 to close 272 partition 206. Closing partition 206 prevents further external access to compartment 237.

Vehicle 201 can notify delivery person (or robot) 231 that item 232 is accepted. Alternately, authorized user 221 can cause device 222 to notify delivery person (or robot) 231 that item 232 is accepted.

In some aspects, partition control components are used to control a plurality of different partitions to separate and provide access to a plurality of different compartments at a vehicle. Different compartments can have different sizes. Differently sized compartments can be used to receive differently sized items. In one aspect, item delivery data associated with a delivery indicates an item size (e.g., dimensions). The item delivery data can be sent to a vehicle prior to delivery of the item. A vehicle processor at the vehicle can use the item size to identify an appropriately sized compartment (e.g., from among a plurality of compartments at the vehicle) for the item.

Some compartments can have higher levels of security than others, for example, some compartments may require a physical key, entry of an access code, etc. Different compartments can also be nested within one another. Partition control components can re-configure partitions in three dimensions relative to other partitions to form and/or control access to different compartments. For example, partitions can be moved along one or more of X, Y, and Z axes to form and/or provide access to different compartments.

Figure 4:
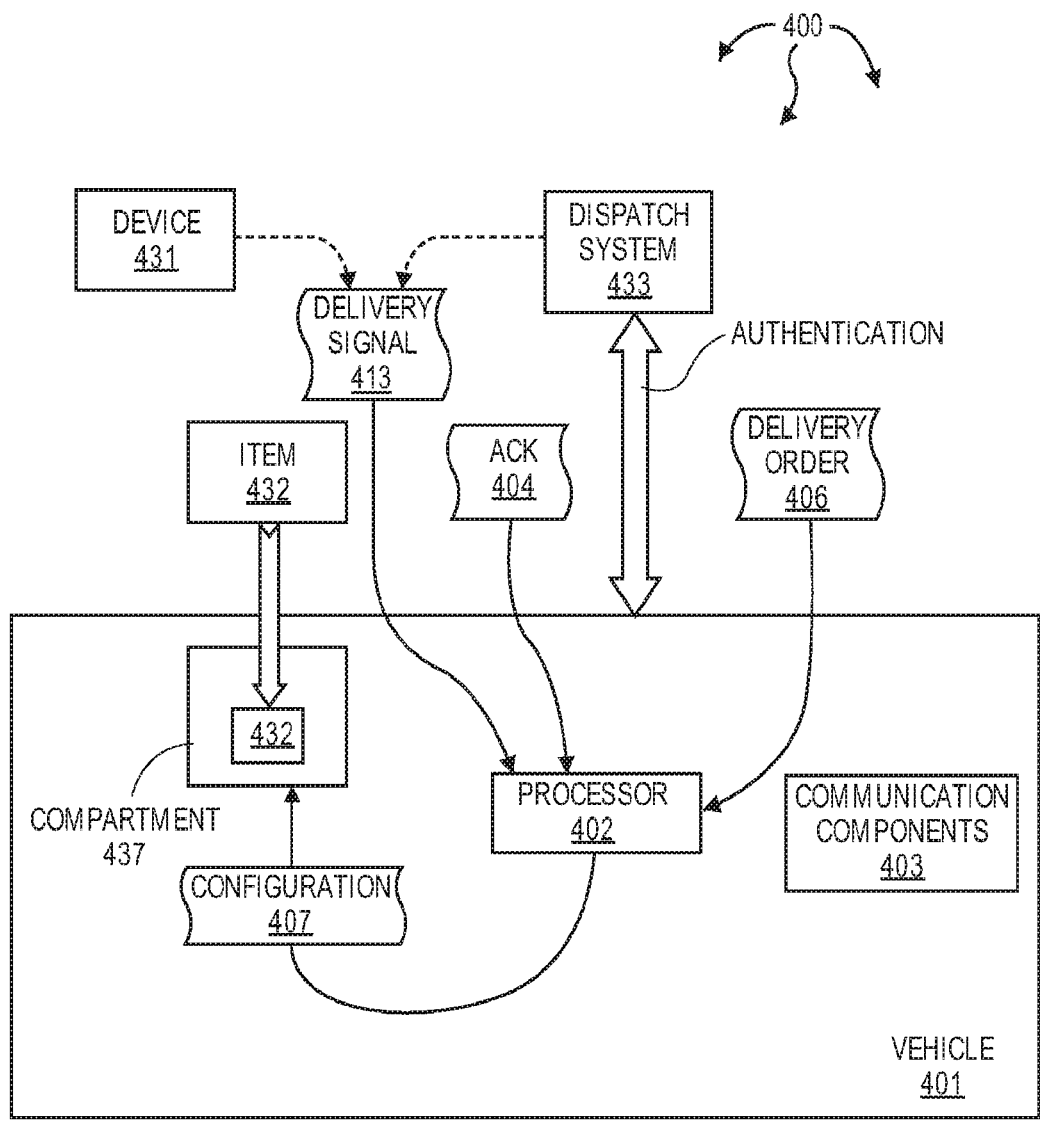
FIG. 4 illustrates another example environment that facilitates delivering items to unattended vehicles.

FIG. 4 illustrates another example environment 400 that facilitates delivering items to unattended vehicles. As depicted, computer environment 400 includes unattended vehicle 401, device 431, and dispatch system 433. Device 431 can be used by a delivery person (or robot) to facilitate the delivery of items. Dispatch system 433 can be a dispatch system for dispatching delivery of items, including dispatching a delivery person (or robot) using device 431.

An authorized user of vehicle 401 can be at a geographical remote location relative to vehicle 401. Vehicle 401 can be a car, truck, bus, van, motorcycle, etc. As depicted, vehicle 401 includes processor 402 (e.g., a hardware processor), communication components 403, and compartment 437.

Processor 402, communication components 403, and any other components can be connected to one another over (or be part of) a network, such as, for example, a PAN, a LAN, a WAN, a controller area network (CAN) bus, and even the Internet. Accordingly, each of processor 402, communication components 403. and any other connected computer systems and their components, can create message related data and exchange message related data (e.g., near field communication (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over the network.

Communication components 403 can include hardware components (e.g., a wireless modem, wireless network card, Bluetooth hardware) and/or software components (e.g., a protocol stack) for wireless communication with other vehicles and/or computer systems. Communication components 403 can be used to facilitate vehicle to vehicle (V2V) communication as well as vehicle to infrastructure (V2I) communication. In some aspects, communication components 403 can receive data from other vehicles and/or devices (e.g., device 431 and/or dispatch system 433) related to the delivery of an item to vehicle 401. Communication components 403 can forward the data to processor 402. Processor 402 can send data for transmission to others vehicles and/or devices to communication components 403.

Figure 5:
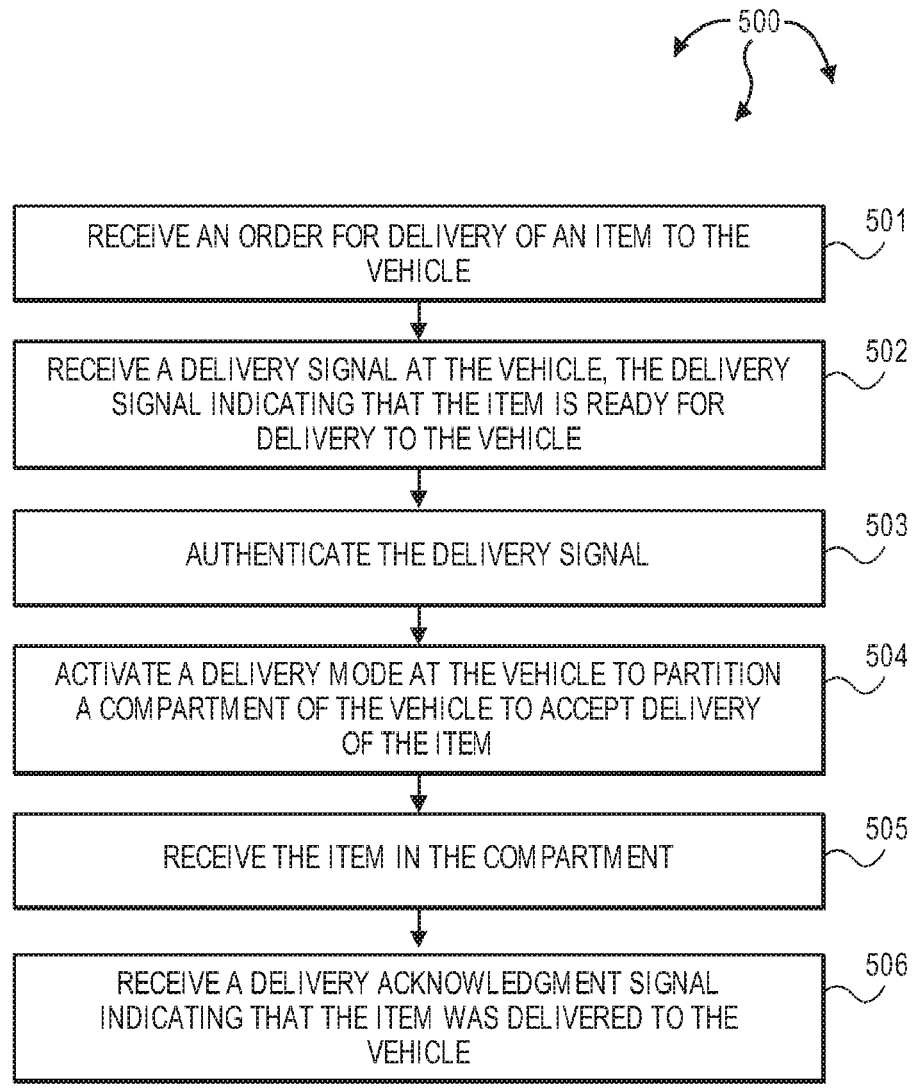
FIG. 5 illustrates a flow chart of another example method for delivering items to unattended vehicles.

FIG. 5 illustrates a flow chart of another example method 500 for delivering items to unattended vehicles. Method 500 will be described with respect to the components and data of computer architecture 400.

Method 500 includes receiving an order for delivery of an item to the vehicle (501). For example, dispatch system 433 can send delivery order 406 to vehicle 401. Processor 402 can receive delivery order 406 from dispatch system 433. Delivery order 406 can indicate item 432 has been ordered for delivery to vehicle 401.

Method 500 includes receiving a delivery signal at the vehicle, the delivery signal indicating that the item is ready for delivery to the vehicle (502). Subsequently, a delivery person (or robot) can bring item 432 to within a specified proximity of vehicle 401. When item 432 is within the specified proximity, device 431 and/or dispatch system 433 can send delivery signal 413 to vehicle 401. Processor 402 can receive delivery signal 413. Delivery signal 413 indicates to processor 402 that item 432 is within the specified proximity to vehicle 401.

Method 500 includes authenticating the delivery signal (503). Processor 402 can authenticate delivery signal 413 with dispatch system 433. Authenticating delivery signal 413 increases the likelihood that delivery signal 413 is legitimate.

Method 500 includes activating a delivery mode at the vehicle to partition a compartment of the vehicle to accept delivery of the item (504). For example, processor 402 can active delivery mode at vehicle 401. Processor 402 can send configuration 407 to one or more partitions to form and/or provide external access to compartment 437. In one aspect, one or more partitions are unlocked to permit restricted access to compartment 437 for purposes of item delivery. Compartment 437 can be separated (by one or more partitions) from other compartments at vehicle 401.

Method 500 includes receiving the item in the compartment (505). Vehicle 401 can receive item 432 in compartment 437 from the delivery person (or robot).

Method 500 includes receiving a delivery acknowledgement signal indicating that the item was delivered to the vehicle (506). For example, upon placement of item 432 in compartment 437, device 431 (or dispatch system 433) can send ACK 404 to vehicle 401. ACK 404 indicates to processor 402 that delivery person (or robot) deems item 432 to be delivered. In one aspect, one or more sensors are used to monitor compartment 437. The one or more sensors can send sensor data to processor 402. Processor 402 can use the sensor data to validate delivery item 432.

When delivery of item 432 is complete, processor 402 can de-activate delivery mode at vehicle 401.

Figure 6A:
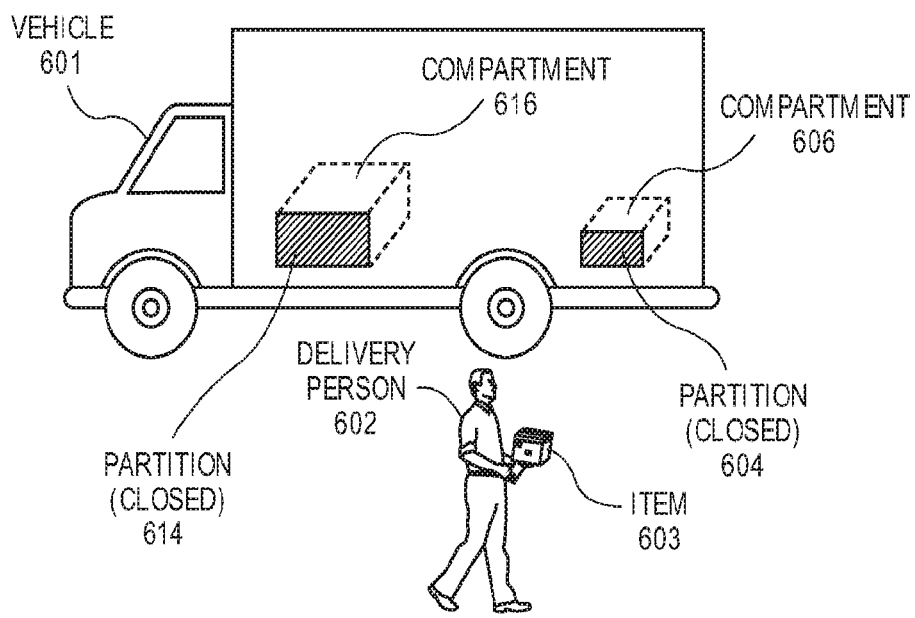
FIGS. 6A-6C illustrate an example of item delivery.
Figure 6B:
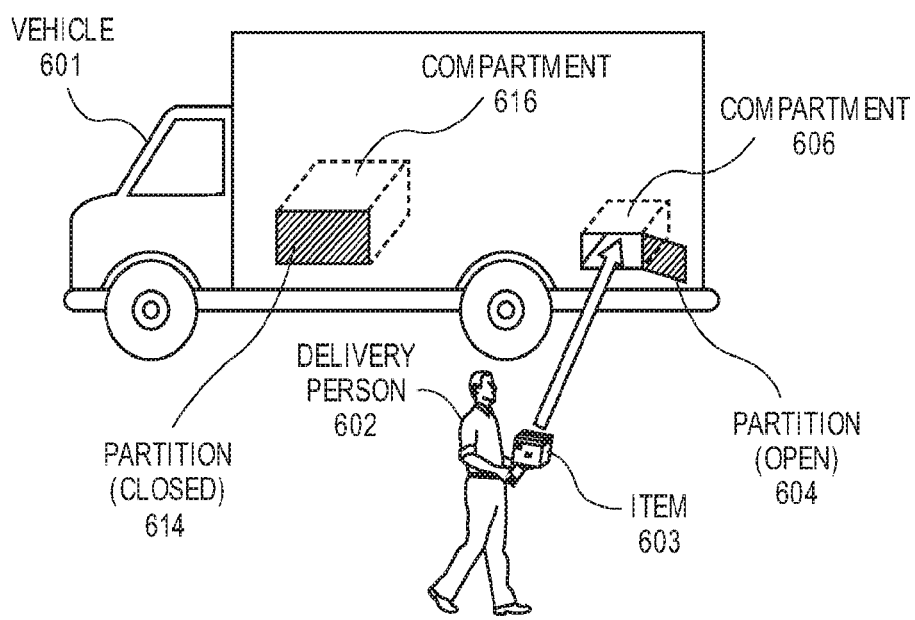
Figure 6C:
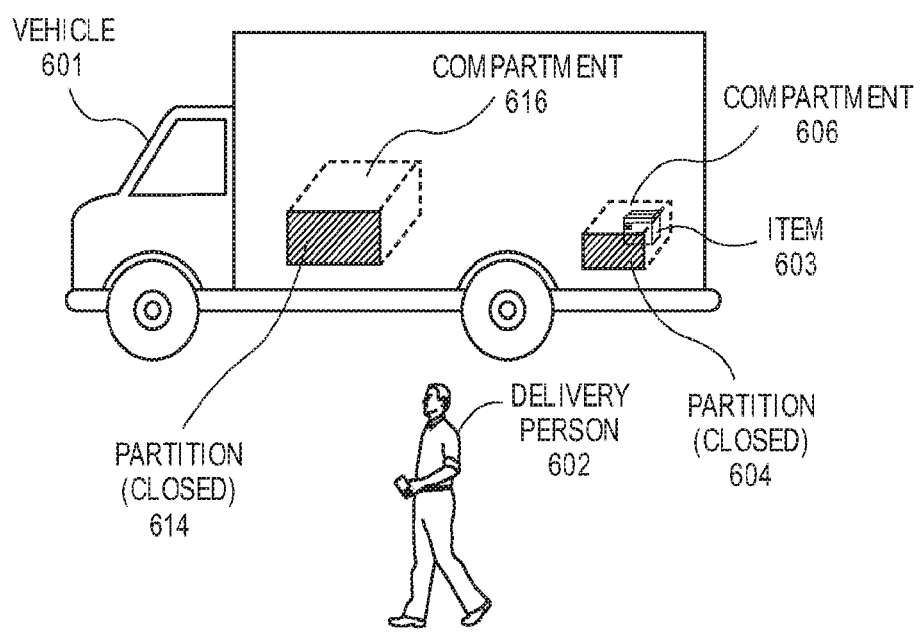

FIGS. 6A-6C illustrate an example of item delivery. In FIG. 6A, vehicle 601 includes compartments 606 and 616. External access to compartments 606 and 616 is prevented by closed partitions 604 and 614 respectively. As depicted, compartment 606 is somewhat smaller than compartment 616. Delivery person 602 can approach vehicle 601 with the intent to deliver item 603.

Turning to FIG. 6B, when delivery person 602 is within a specified proximity of vehicle 601, vehicle 601 can be signaled to indicate a delivery. In response, vehicle 601 can determine that compartment 606 is appropriately sized to receive item 603. Vehicle 601 can open partition 604 to provide external access to compartment 606. Delivery person 602 can place item 603 into compartment 606. Vehicle 602 can then be signaled to indicate that item 603 has been delivered.

Turning to FIG. 6C, vehicle 601 can validate delivery of item 603. Vehicle 601 can close partition 604 preventing further external access to compartment 606.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can transform information between different formats, such as, for example, sensor data, open commands, close commands, switch input, video streams, item available notifications, item delivered notifications, activate commands, de-activate commands, delivery orders, delivery signals, acknowledgments, partition configuration changes, etc.

System memory can be coupled to the one or more processors and can store instructions (e.g., computer-readable instructions, computer-executable instructions, etc.) executed by the one or more processors. The system memory can also be configured to store any of a plurality of other types of data generated by the described components, such as, for example, sensor data, open commands, close commands, switch input, video streams, item available notifications, item delivered notifications, activate commands, de-activate commands, delivery orders, delivery signals, acknowledgments, partition configuration changes, etc.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash or other vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. At a vehicle, a method for receiving an item comprising:
in response to an activate command, configuring one or more physical partitions in the vehicle to open to provide access to a delivery compartment, wherein the one or more physical partitions physically restrict access to areas within the vehicle where access is not necessary for receiving the item; detecting that an item has been placed within the delivery compartment; notifying one or more authorized users of the detection; and in response to a de-activate command, reconfiguring the one or more reconfigurable physical partitions to close to prevent access to the delivery compartment, wherein reconfiguring one or more physical partitions in the vehicle to provide access to a delivery compartment comprises reconfiguring one or more physical partitions along an X axis, a Y axis, and a Z axis to provide access to different compartments of the plurality of compartments in one of: a trunk, a backseat, a truck bed, or a cargo area, wherein the delivery compartment is one of a plurality of compartments disposed within a trunk, a backseat, a truck bed, or a cargo area of the vehicle.

2. The method of claim 1, further comprising: receiving a notification that the item is ready for delivery to the vehicle; notifying the one or more authorized users via that the item is ready for delivery to the vehicle; and receiving the activate command to activate delivery mode at the vehicle.

3. The method of claim 2, further comprising receiving the de-activate command to de-activate delivery mode at the vehicle, wherein de-activating the delivery mode at the vehicle comprises reconfiguring the one or more reconfigurable physical partitions to close to prevent access to the delivery compartment.

4. The method of claim 1, wherein detecting that an item has been placed within the delivery compartment comprises receiving sensor data from one or more sensor monitoring the delivery compartment, and wherein the delivery compartment is a higher-security delivery compartment nested inside another compartment of the plurality of compartments.

5. The method of claim 1, wherein detecting that an item has been placed within the delivery compartment comprises detecting selection of a switch at the vehicle, wherein the selection of the switch sends a switch input to indicate that the item has been placed within the delivery compartment.

6. A vehicle comprising: one or more processors; system memory coupled to the one or more processors, the system memory storing instructions that are executable by the one or more processors; one or more configurable physical partitions that can be configured to provide access to a delivery compartment at the vehicle and that can be configured to prevent access to the delivery compartment; one or more sensors for sensing contents of the delivery compartment; the one or more processors configured to execute the instructions stored in the system memory to receive delivery of an item at the delivery compartment, including the following: receive a notification that an item is ready for delivery to the vehicle; notify one or more authorized users via wireless communication that the item is ready for delivery to the vehicle; receive an activate command to activate delivery mode at the vehicle, the activate command received via wireless communication; subsequent to receiving the activate command, configure the one or more configurable physical partitions to open to provide external access to the delivery compartment, wherein the one or more configurable physical partitions physically restrict access to areas within the vehicle where access is not necessary for receiving the item; receive an indication that the item has been placed within the delivery compartment; and reconfigure the one or more configurable physical partitions to close to prevent external access to the delivery compartment, wherein reconfiguring one or more physical partitions in the vehicle to provide access to a delivery compartment comprises reconfiguring one or more physical partitions along an X axis, a Y axis, and a Z axis to provide access to different compartments of the plurality of compartments, wherein the delivery compartment is one of a plurality of compartments disposed within a trunk, a backseat, a truck bed, or a cargo area of the vehicle.

7. The vehicle of claim 6, further comprising the one or more processors configured to execute the instructions stored in the system memory to: notify the one or more authorized users via wireless communication that the item has been placed within the delivery compartment; and receive a de-activate command to de-activate delivery mode at the vehicle, the de-activate command received via wireless communication; and wherein the one or more processors configured to execute the instructions stored in the system memory to reconfigure the one or more reconfigurable physical partitions comprise the one or more processors configured to execute the instructions stored in the system memory to reconfigure the one or more reconfigurable physical partitions to close to prevent access to the delivery compartment in response to the de-activate command.

8. The vehicle of claim 7, wherein the one or more processors configured to execute the instructions stored in the system memory to receive a de-activate command to de-activate delivery mode at the vehicle comprises the one or more processors configured to execute the instructions stored in the system memory to receiving an indication that a setting was selected at a switch.

9. The vehicle of claim 6, wherein the one or more processors configured to execute the instructions stored in the system memory to receive a notification that an item is ready for delivery to the vehicle comprises receiving an electronic message from a deliver entity, the delivery entity selected from among a person and a robot.

10. The vehicle of claim 6, further comprising the one or more processors configured to execute the instructions stored in the system memory to prior to reconfiguring the one or more reconfigurable physical partitions: activate a switch at the vehicle, the switch being physical or virtual and having a setting for indicating that the one or more reconfigurable partitions are to be reconfigured for delivery mode; and detect that the setting was selected at the switch.

11. The vehicle of claim 6, wherein the one or more processors configured to execute the instructions stored in the system memory to receive an indication that the item has been placed within the delivery compartment comprises the one or more processors configured to execute the instructions stored in the system memory to receive sensor data from the one or more sensors, the sensor data indicating that the item has been placed in the delivery compartment.

12. The vehicle of claim 6, wherein the one or more processors configured to execute the instructions stored in the system memory to receive an indication that the item has been placed within the delivery compartment comprising one or more processors configured to execute the instructions stored in the system memory to: send a video stream from a camera to a device associated with at least one of the one of more authorized users, the camera included in the one or more sensors;

and receive a de-activate command from the device via wireless communication, the de-activate command instructing the vehicle to de-activate delivery mode at the vehicle.

13. The vehicle of claim 6, wherein the vehicle is one of: a car, a truck, a bus, or a van.

14. At a vehicle, a method for receiving delivery of an item at the vehicle, the method comprising: receiving an order for delivery of an item to the vehicle, the vehicle including a communication system and a remotely controllable delivery compartment; receiving a delivery signal at the vehicle, the deliver signal indicating that the item is ready for delivery to the vehicle; authenticating the delivery signal; activating a delivery mode at the vehicle to partition a compartment of the vehicle to open to accept delivery of the item, wherein one or more physical partitions physically restrict access to areas within the vehicle where access is not necessary for receiving the item, wherein the compartment is one of a plurality of compartments disposed within a trunk, a backseat, a truck bed, or a cargo area of the vehicle; reconfigure the one or more configurable physical partitions to close to prevent external access to the delivery compartment, wherein reconfiguring one or more physical partitions in the vehicle to provide access to a delivery compartment comprises reconfiguring one or more physical partitions along an X axis, a Y axis, and a Z axis to provide access to different compartments of the plurality of compartments; receiving the item in the compartment;

and receiving a delivery acknowledgement signal indicating that the item was delivered to the vehicle.

15. The method of claim 14, wherein activating a delivery mode at the vehicle comprises granting restricted access to the compartment for delivery of the item.

16. The method of claim 14, wherein receiving a delivery signal comprises receiving a delivery signal from a remote device associated with an entity delivering the item, the entity selected from among: a person or a robot.

17. The method of claim 14, wherein activating a delivery mode at the vehicle comprises granting access to the compartment for delivery of the item by performing one or more of: unlocking the compartment and partitioning the compartment from other compartments at the vehicle.

18. The method of claim 14, wherein receiving a delivery signal at the vehicle comprises receiving a delivery signal from a delivery service device in proximity to the vehicle.

19. The method of claim 14, wherein receiving a delivery signal at the vehicle comprises receiving a delivery signal from a delivery service dispatch system when the item is in proximity to the vehicle.

* * * * *